United States Patent
Kim et al.

(10) Patent No.: US 11,210,567 B2
(45) Date of Patent: Dec. 28, 2021

(54) ARTIFICIAL INTELLIGENCE APPARATUS AND METHOD FOR RECOGNIZING OBJECT

(71) Applicant: LG ELECTRONICS INC., Seoul (KR)

(72) Inventors: Jaehong Kim, Seoul (KR); Suyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 16/728,630

(22) Filed: Dec. 27, 2019

(65) Prior Publication Data

US 2021/0166084 A1 Jun. 3, 2021

(30) Foreign Application Priority Data

Nov. 28, 2019 (KR) .......................... 10-2019-0155159

(51) Int. Cl.
*G06K 9/00* (2006.01)
*G06K 9/62* (2006.01)
*G06N 3/08* (2006.01)

(52) U.S. Cl.
CPC ......... *G06K 9/6265* (2013.01); *G06K 9/6221* (2013.01); *G06K 9/6256* (2013.01); *G06N 3/08* (2013.01)

(58) Field of Classification Search
CPC ........ G06K 9/66; G06K 9/005; G06K 9/6254; G06K 9/6255; G06K 9/4628; G06K 9/32; G06K 9/2013; G06K 9/344; G06K 9/202; G06K 9/2011; G06K 9/72; G06K 9/222; G06K 9/6217; G06K 9/00718; G06K 9/03; G06K 9/38; G06K 9/6265; G06K 9/6256; H04N 7/0145; G06F 17/3072
See application file for complete search history.

(56) References Cited

U.S. PATENT DOCUMENTS

| | | | | |
|---|---|---|---|---|
| 7,150,009 | B2* | 12/2006 | Bacon | G06F 9/4493 |
| | | | | 717/127 |
| 7,734,071 | B2* | 6/2010 | Heisele | G06K 9/00281 |
| | | | | 382/118 |
| 7,751,625 | B2* | 7/2010 | Ulrich | G06K 9/6255 |
| | | | | 382/199 |
| 7,783,082 | B2* | 8/2010 | Koshizen | G06K 9/00973 |
| | | | | 382/118 |
| 10,282,663 | B2* | 5/2019 | Socher | G06K 9/00201 |
| 10,452,947 | B1* | 10/2019 | Ahmed | G06K 9/627 |
| 10,452,955 | B2* | 10/2019 | Gao | G06K 9/4628 |
| 2014/0301635 | A1* | 10/2014 | Soatto | G06T 7/246 |
| | | | | 382/159 |
| 2018/0286398 | A1* | 10/2018 | Nakano | G06K 9/4676 |
| 2019/0317879 | A1* | 10/2019 | McCormick | G06F 11/3664 |
| 2020/0042832 | A1* | 2/2020 | Kim | G06K 9/6262 |
| 2020/0234119 | A1* | 7/2020 | Shi | G06N 3/04 |

* cited by examiner

*Primary Examiner* — Amir Alavi
(74) *Attorney, Agent, or Firm* — Birch, Stewart, Kolasch & Birch, LLP

(57) ABSTRACT

An artificial intelligence apparatus for recognizing an object includes a camera, a memory configured to store a plurality of object recognition models sharing at least one shared layer each other, and a processor configured to receive, via the camera, image data including an object, recognize the object included in the image data by using an object recognition model set including the plurality of object recognition models, and update the object recognition model set based on an object recognition frequency.

14 Claims, 13 Drawing Sheets

ARTIFICIAL INTELLIGENCE APPARATUS AND METHOD FOR RECOGNIZING OBJECT

CROSS-REFERENCE TO RELATED APPLICATIONS

This application claims priority to Korean Patent Application No. 10-2019-0155159 filed in the Republic of Korea on Nov. 28, 2019, the entire contents of which are hereby incorporated by reference in its entirety.

BACKGROUND

The present disclosure relates to an artificial intelligence apparatus and method for recognizing an object by using a plurality of object recognition models sharing at least one layer each other.

Recently, the performance of image recognition technology using artificial intelligence (AI) in vehicles has been greatly improved. However, in order to learn an object recognition model used to recognize an object included in image data, a lot of training data is required and a lot of computation is required for learning using the same. In addition, if only one object recognition model is used, it is inefficient because it is necessary to re-learn the entire model even if a change occurs in one recognition target object.

Therefore, there is a need for a method capable of updating and managing a recognition target object with a small amount of learning in an edge device mounted on an actual object recognition model.

SUMMARY

The present disclosure provides an artificial intelligence apparatus and method capable of updating and managing an object recognition model for recognizing an object in image data with a small amount of computation.

The present disclosure also provides an artificial intelligence apparatus and method for dynamically managing object recognition models based on a recognition frequency of an object.

One embodiment of the present disclosure provides an artificial intelligence apparatus and method for receiving image data including an object, recognizing the object from the received image data by using an object recognition model set including a plurality of object recognition models sharing at least one shared layer each other, and updating the object recognition model set based on an object recognition frequency.

One embodiment of the present disclosure provides an artificial intelligence apparatus and method, in which each object recognition model includes at least one shared layer and at least one unshared layer, and the unshared layer includes at least one batch normalization layer and an output layer.

One embodiment of the present disclosure provides an artificial intelligence apparatus and method for determining, as unknown objects, objects that fail to be recognized, clustering the unknown objects, calculating cluster recognition frequencies of the clusters, and updating an object recognition model set in consideration of an object recognition frequency and a cluster recognition frequency.

The details of one or more embodiments are set forth in the accompanying drawings and the description below. Other features will be apparent from the description and drawings, and from the claims.

DETAILED DESCRIPTION OF THE EMBODIMENTS

Figure 1:
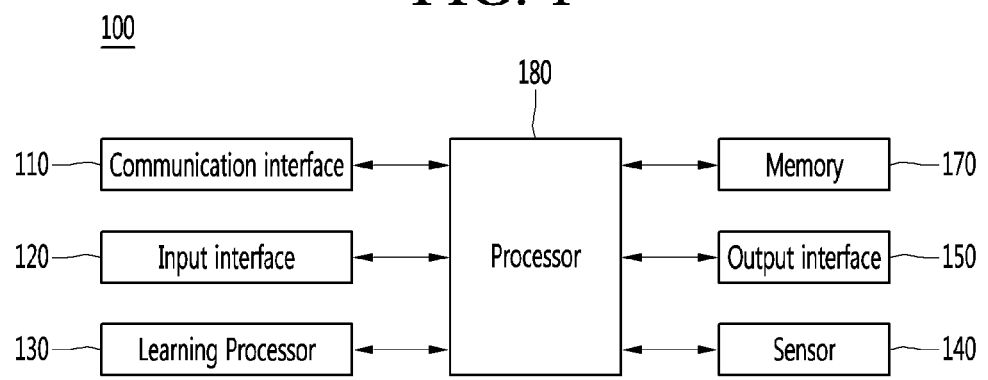
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a traveling actuator including an actuator or a motor and may perform various physical operations such as moving a robot joint. In addition, a movable robot may include a wheel, a brake, a propeller, and the like in a traveling actuator, and may travel on the ground through the traveling actuator or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensor 140, an output interface 150, a memory 170, and a processor 180.

The communication interface 110 may transmit and receive data to and from external devices such as other AI apparatuses 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensor 140 may acquire at least one of internal information about the AI apparatus 100, ambient environment information about the AI apparatus 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
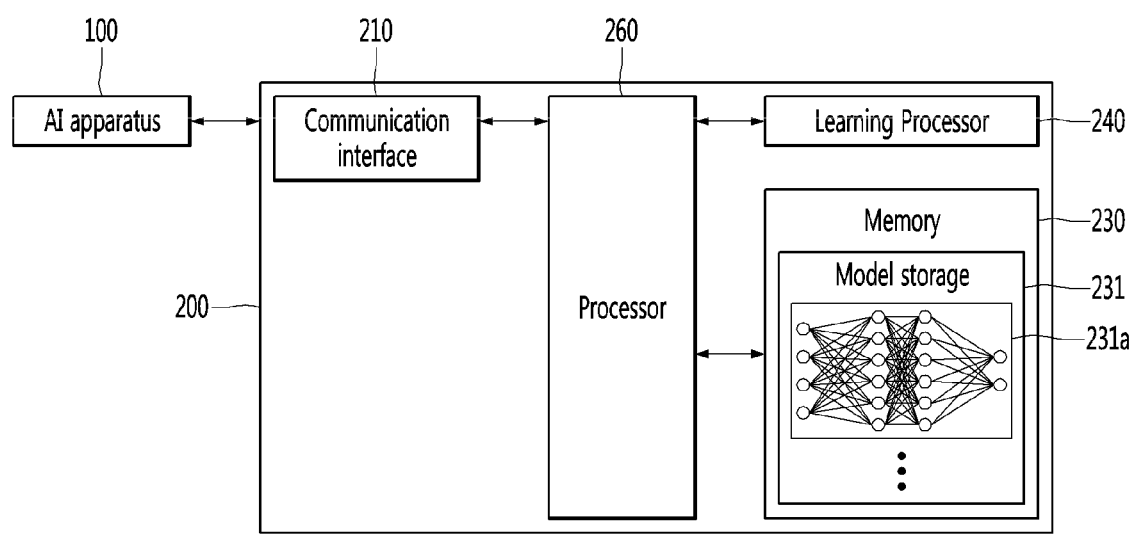
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage 231. The model storage 231 may store a learning or learned model (or an artificial neural network 231*a*) through the learning processor 240.

The learning processor 240 may learn the artificial neural network 231*a* by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
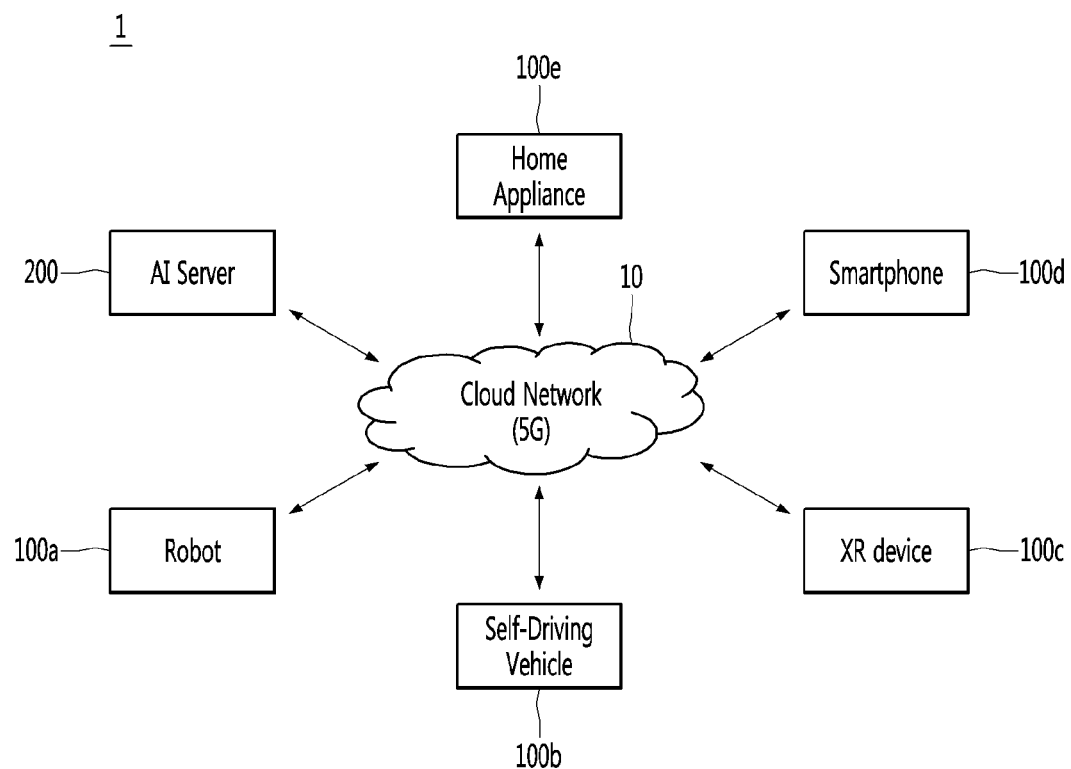
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the traveling actuator such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the traveling actuator based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the traveling actuator such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the traveling actuator based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the traveling actuator is in a drowsy state, the robot 100a may activate the self-driving function of the self-driving vehicle 100b or assist the control of the traveling actuator of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
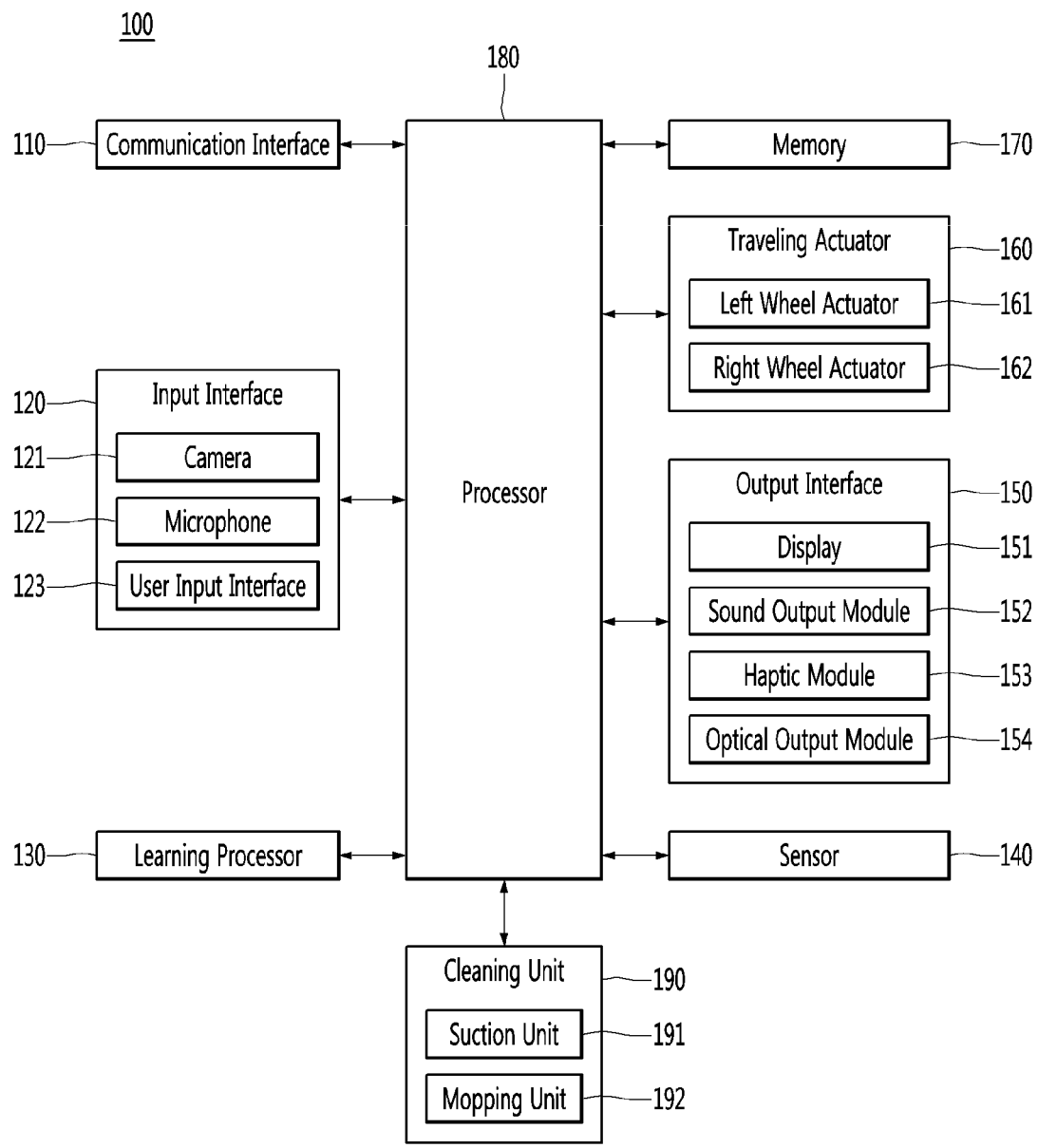
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication interface 110 may also be referred to as a communication modem or a communication circuit.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensor 140 may also be referred to as a sensor module.

The output interface 150 may include at least one of a display 151, a sound output module 152, a haptic module 153, or an optical output module 154.

The display 151 may display (output) information processed in the AI apparatus 100. For example, the display 151 may display execution screen information of an application program running on the AI apparatus 100 or user interface (UI) and graphic user interface (GUI) information according to such execution screen information.

The display 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

The traveling actuator 160 may move the AI apparatus 100 in a specific direction or by a certain distance. The traveling actuator 160 may include a left wheel actuator 161 to drive the left wheel of the AI apparatus 100 and a right wheel actuator 162 to drive the right wheel.

The left wheel actuator 161 may include a motor for driving the left wheel, and the right wheel actuator 162 may include a motor for driving the right wheel. Although the traveling actuator 160 includes the left wheel actuator 161 and the right wheel actuator 162 by way of example as in FIG. 4, but the present disclosure is not limited thereto. In other words, according to an embodiment, the traveling actuator 160 may include only one wheel.

The cleaner 190 may include at least one of a suction part 191 or a mopping part 192 to clean the floor around the AI apparatus 100.

The suction part 191 may be referred to as a vacuum cleaner. The suction part 191 may suction air to suction foreign matters such as dust and garbage around the AI apparatus 100. The suction part 191 may include a brush or the like to collect foreign matters.

The mopping part 192 may wipe the floor in the state that a mop is at least partially in contact with the bottom surface of the AI apparatus 100. The mopping part 192 may include a mop and a mop driver to move the mop. The mopping part 192 may adjust the distance from the ground surface through the mop driver. In other words, the mop driver may operate such that the mop makes contact with the ground surface when the mopping is necessary.

According to various embodiments of the present disclosure, the AI apparatus 100 may be implemented as an AI robot cleaner or an AI robot, which recognizes an object from image data and travels in consideration of the recognized object.

Figure 5:
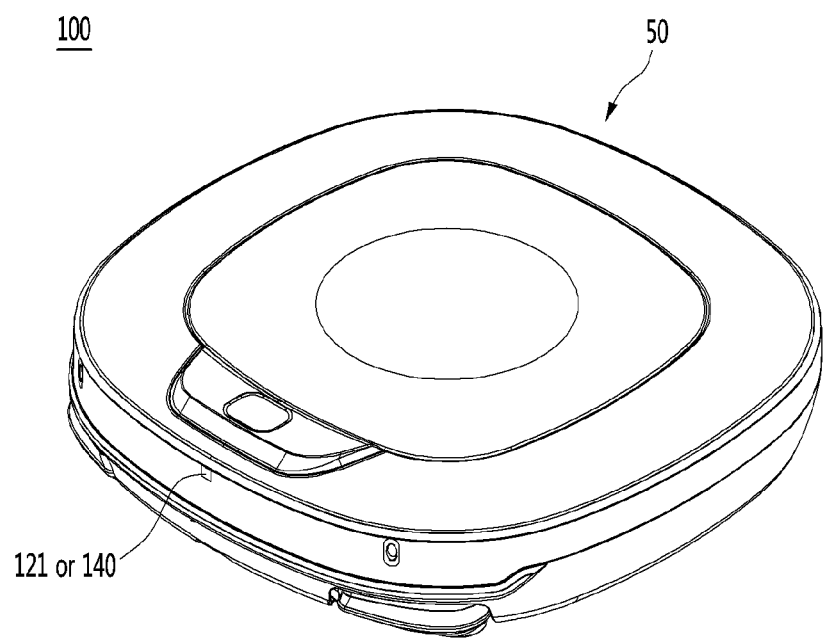
FIG. 5 is a perspective view of an AI apparatus according to an embodiment of the present disclosure.

FIG. 5 is a perspective view of the AI apparatus 100 according to an embodiment of the present disclosure.

Referring to FIG. 5, the AI apparatus 100 may be implemented as an AI robot cleaner and may include a cleaner body 50 and a camera 121 or a sensor 140.

The camera 121 or the sensor 140 may irradiate a light forward and receive the reflected light. The processor 180 may acquire the depth information using the difference between times at which the received lights acquired by the camera 121 or the sensor 140 are returned.

Figure 6:
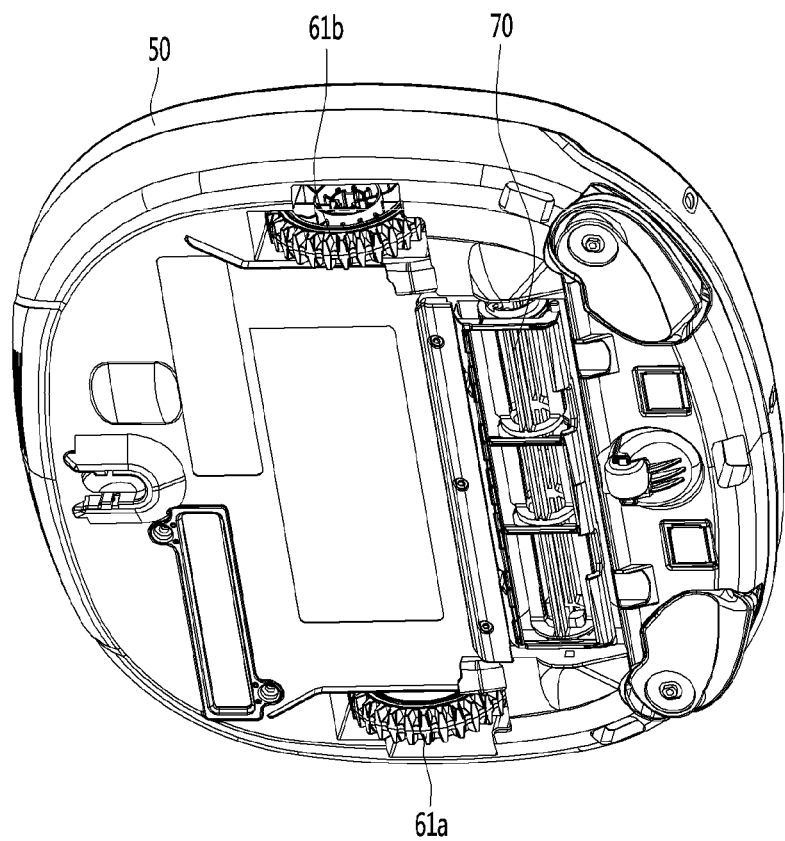
FIG. 6 is a bottom view of an AI apparatus according to an embodiment of the present disclosure.

FIG. 6 is a bottom view of the AI apparatus 100 according to an embodiment of the present disclosure.

Referring to FIG. 6, the AI apparatus 100 may further include a cleaner body 50, a left wheel 61a, a right wheel 61b, and a suction part 70.

The left wheel 61a and the right wheel 61b may allow the cleaner body 50 to travel. The left wheel actuator 161 may drive the left wheel 61a and the right wheel actuator 162 may drive the right wheel 61b. As the left wheel 61a and the right wheel 61b are rotated by the traveling actuator 160, the AI apparatus 100 may suction foreign matters such as dust and garbage through the suction part 70.

The suction part 70 is provided in the cleaner body 50 to suction dust on the floor surface. The suction part 70 may further include a filter (not illustrate) to collect foreign matters from the sucked air stream and a foreign matter receiver (not illustrated) to accumulate foreign matters collected through the filter.

The AI apparatus 100 may further include a mopping part (not illustrated). The mopping part (not shown) may include a damp cloth/mop (not illustrated) and a motor (not illustrated) to rotate the damp cloth in contact with the floor and to move the damp cloth along a set pattern. The AI apparatus 100 may wipe the floor with the damp cloth (not illustrated).

Figure 7:
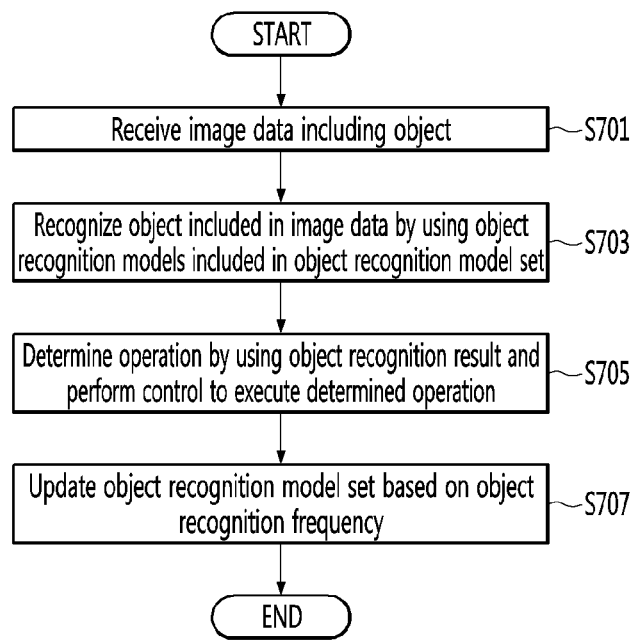
FIG. 7 is a flowchart illustrating a method for recognizing an object according to an embodiment of the present disclosure.

FIG. 7 is a flowchart illustrating a method for recognizing an object according to an embodiment of the present disclosure.

Referring to FIG. 7, the processor 180 of the AI apparatus 100 receives image data including an object (S701).

The processor 180 may receive image data including an object from the camera 121 or the sensor 140, or may receive image data including an object from an external device (not shown) via the communication interface 110. The image data may include one or more objects.

The external device (not shown) may refer to a device that includes a camera or an image sensor to generate image data and includes a communication interface to transmit the generated image data to another device. For example, the external device (not shown) may include an IoT camera, a surveillance camera, a drone, a robot, and the like.

The image data may include at least one of RGB image data, IR image data, or depth image data. For example, the image data according to an embodiment may be RGB-IR image data including RGB information and IR information for each pixel.

The processor 180 of the AI apparatus 100 recognizes the object included in the image data by using object recognition models included in the object recognition model set (S703).

The object recognition model set may include a plurality of object recognition models to be used to recognize the object included in the image data. Each of the object recognition models may refer to a model for recognizing only one predefined type of object in the image data. For example, a first object recognition model or a dog recognition model may be a model for determining whether a dog is included in image data. Therefore, the object recognition model set may recognize various types of objects using the plurality of object recognition models and may be regarded as a single object recognition model.

Each of the object recognition models includes an artificial neural network and may be learned using a machine learning algorithm or a deep learning algorithm. Since the object recognition model recognizes only one type of object in the image data, the object recognition model may include a convolutional neural network (CNN), and the output layer may include a single node indicating whether a recognition target object is included in the image data. For example, if the single node included in the output layer of the dog recognition model has an output value of 1, this may mean that the dog is included in the input image data, and if the output value is 0, this may mean that the dog is not included in the input image data.

The processor 180 may recognize the object included in the image data by using each of one or more object recognition models included in the object recognition model set. Therefore, if a plurality of different types of objects are included in the image data, the plurality of objects may be recognized based on different object recognition models.

The object recognition models included in the object recognition model set may share at least part of layers each other. That is, each of the object recognition models may include one or more shared layers and one or more unshared layers. The unshared layers may refer to layers that are independent of each other without sharing object recognition models each other.

The unshared layer may include at least one batch normalization (BN) layer and an output layer. The batch normalization layer may refer to a layer for normalizing a value input in a batch unit, scaling and shifting the normalized value, and outputting the resulting value. In this case, the learning target in the batch normalization layer is a scale factor and a shift factor.

The output layer of each of the object recognition models is an unshared layer. As described above, the output layer may include only a single node indicating whether the recognition target object of the object recognition model is included in the image data.

If the processor 180 fails to recognize the object included in the image data even though all the object recognition models included in the object recognition model set are used, the processor 180 may determine the object included in the image data as an unknown object or an object belonging to an unknown class. In this regard, the object recognition model set may be regarded as an open set recognition model.

The processor 180 may store image data determined as including the unknown object in the memory 170 as training data so as to learn a new object recognition model used to recognize objects determined the unknown object and re-learn an existing object recognition model.

The processor 180 of the AI apparatus 100 determines an operation using an object recognition result and performs a control to execute the determined operation (S705).

The processor 180 may determine a currently executing operation or an operation suitable for a current operation by using information about unknown objects as well as information about recognized objects (or successfully recognized objects), and may perform a control to execute the determined operation.

In one embodiment, the processor 180 may determine the traveling moving line and a traveling schedule based on the object recognition result, and control the traveling actuator 160 based on the determined traveling moving line and the determined traveling schedule. For example, if the processor 180 is executing an operation of following a specific object and the object to be followed is recognized, the processor 180 may determine a traveling moving line moving to the recognized object to be followed. Alternatively, if the processor 180 is traveling along the determined traveling moving line and an unknown object is recognized in front of the processor 180, the processor 180 may update the traveling moving line with the traveling moving line that avoids the unknown object.

In one embodiment, the processor 180 may output object recognition information generated via the output interface 150. For example, if the processor 180 performs an operation of outputting information about an object included in image data, the processor 180 may output an object recognition result via the display 151 or the sound output module 152.

The processor 180 of the AI apparatus 100 updates the object recognition model set based on an object recognition frequency (S707).

The processor 180 may calculate an object recognition frequency of the recognized object and a recognition frequency of an unknown object based on the object recognition result, change the configuration of the object recognition models to be included in the object recognition model set based on the calculated recognition frequency, learn or re-learn at least one of the object recognition models to be included in the object recognition model set, and update the at least one of the object recognition models. For example, if a recognition frequency for a specific object is less than a predetermined reference value, or example, the processor 180 may exclude the object recognition model for recognizing the specific object from the object recognition model set. A detailed description thereof will be described below.

Steps illustrated in FIG. 7 may be performed repeatedly, and accordingly, the AI apparatus 100 may repeatedly recognize the object while updating the object recognition model set.

The order of the steps illustrated in FIG. 7 is merely an example, and the present disclosure is not limited thereto. That is, in one embodiment, the order of some of steps illustrated in FIG. 7 may be reversed. In addition, in one embodiment, some of steps illustrated in FIG. 7 may be performed in parallel.

Figure 8:
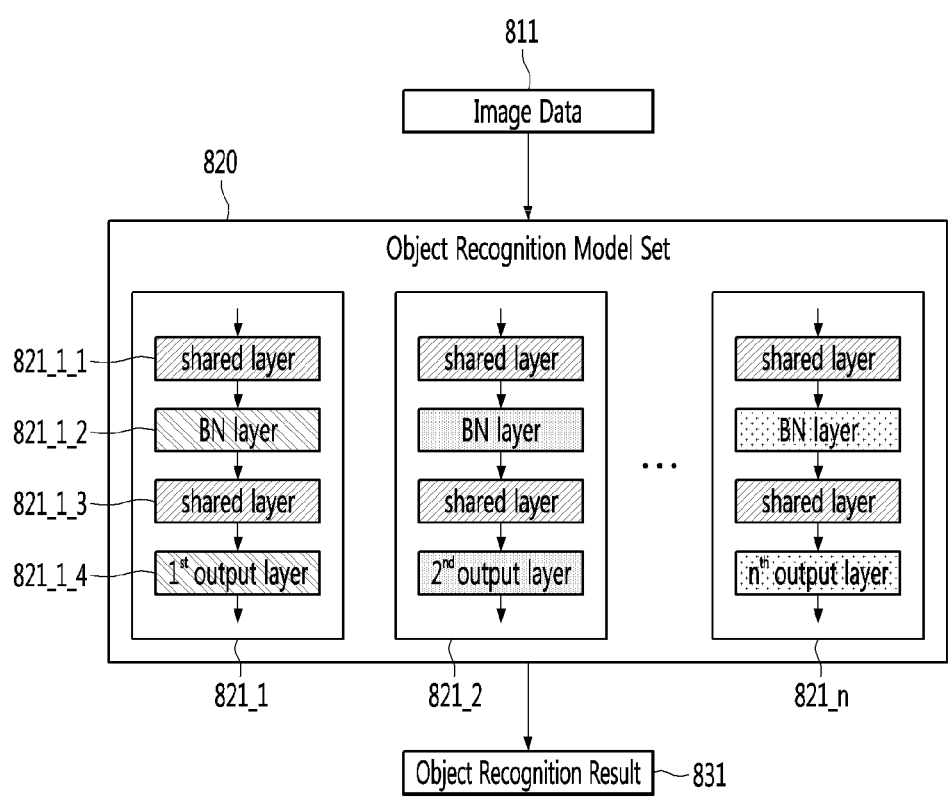
FIG. 8 is a view illustrating a method for recognizing an object according to an embodiment of the present disclosure.

FIG. 8 is a view illustrating a method for recognizing an object according to an embodiment of the present disclosure.

Referring to FIG. 8, the processor 180 of the AI apparatus 100 may generate an object recognition result 831 from image data 811 by using an object recognition model set 820.

The object recognition model set 820 may include a plurality of object recognition models 821_1, 821_2, and 821_*n*. Each of the object recognition models 821_1, 821_2, and 821_*n* may recognize one predefined type of object from the image data 811. The first object recognition model 821_1 may be a model for recognizing a first predetermined object, the second object recognition model 821_2 may be a model for recognizing a second predetermined object, and the n-th object recognition model 821_*n* may be a model for recognizing an n-th object.

Each of the object recognition models 821_1, 821_2, and 821_*n* may include at least one shared layer 821_1_1 and 821_1_3 that are identical to each other among the object recognition models 821_1, 821_2, and 821_*n*. The first shared layer 821_1_1 and the second shared layer 821_1_3 need not have the same structure and model parameters.

Each of the object recognition models 821_1, 821_2, and 821_*n* may include at least one unshared layer 821_1_2 and 821_1_4. The unshared layer may include at least one batch normalization layer (BN layer) 821_1_2 and an output layer 821_1_4. That is, the first object recognition model 821_1 may include the batch normalization layer 821_1_2 as the unshared layer and the first output layer 821_1_4, and the first output layer 821_1_4 may be a layer that outputs whether the first predetermined object is included in the image data 811. Furthermore, the unshared layer may further include other types of layers other than the batch normalization layer 821_1_2 and the output layer 821_1_4.

Each of the shared layers 821_1_1 and 821_1_3 may be updated together when each of the object recognition models 821_1, 821_2, and 821_*n* is updated. For example, in the process of updating the first object recognition model 821_1, the first shared layer 821_1_1 and the second shared layer 821_1_3 may be updated. Accordingly, the first shared layer and the second shared layer included in the second object recognition model 821_1 and the n-th object recognition model 821_*n* may be updated in the same manner.

In one embodiment, each of the shared layers 821_1_1 and 821_1_3 may not be updated together when each of the object recognition models 821_1, 821_2 and 821_*n* is updated. For example, even if the first shared layer 821_1_1 and the second shared layer 821_1_3 are updated in the process of updating the first object recognition model 821_1, the first shared layer and the second shared layer included in the second object recognition model 821_1 and the n-th object recognition model 821_n may be maintained without being updated. However, at least in the initial learning process of the object recognition models 821_1, 821_2, 821_n, the shared layers 821_1_1 and 821_1_3 included in all the object recognition models 821_1, 821_2, and 821_n need to be updated in the same manner.

The initial learning of each of the object recognition models 821_1, 821_2, and 821_n is performed in not only the processor 180 or the learning processor 130 of the AI apparatus 100 but also in the processor 260 or the learning processor of the AI server 200. That is, if each of the object recognition models 821_1, 821_2, and 821_n is learned in the AI server 200, the processor 180 of the AI apparatus 100 may receive the learned object recognition models 821_1, 821_2, and 821_n from the AI server 200 via the communication interface 110, and store the received learned object recognition models 821_1, 821_2, and 821_n in the memory 170. Even if the learning of at least one object recognition model 821_1, 821_2, and 821_n is necessary later, the learning may be performed in the processor 260 or the learning processor 240 of the AI server 200 as well as the processor 180 or the learning processor 130 of the AI apparatus 100. However, as the object recognition models 821_1, 821_2, and 821_n include at least one shared layer 821_1_1 and 821_1_3, the object recognition models may be updated with a relatively less amount of computation. Therefore, additional learning of the object recognition models 821_1, 821_2, and 821_n may be effectively performed through the processor 180 or the learning processor 130 in the AI apparatus 100 as an edge device.

Figure 9:
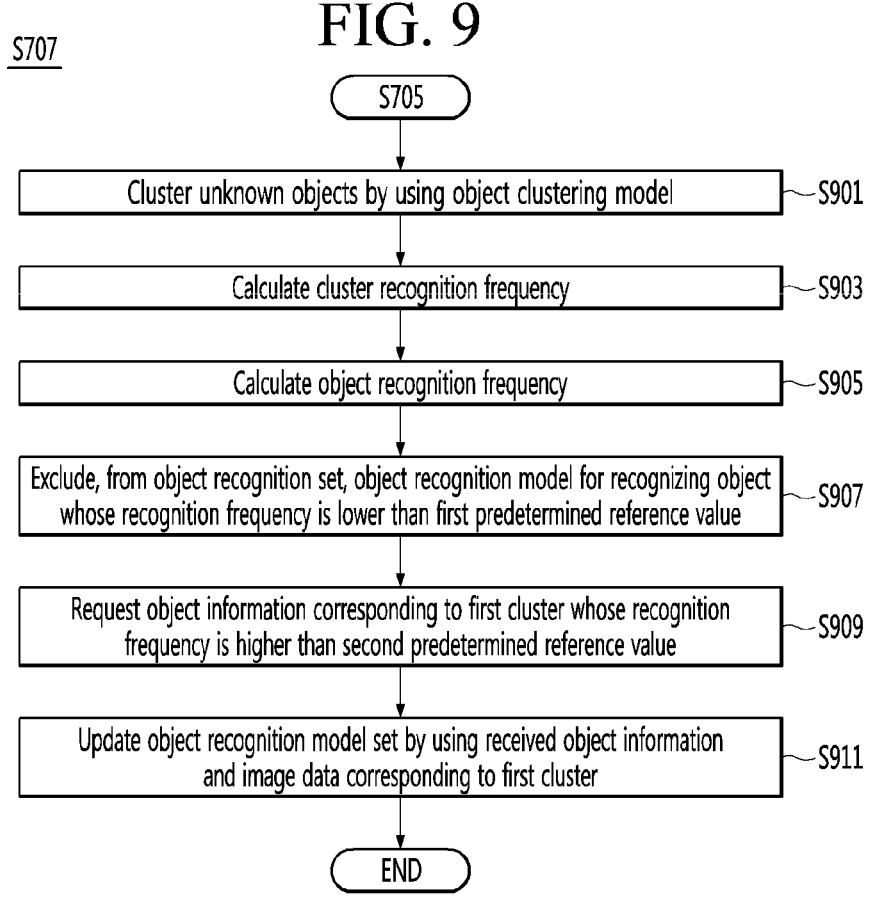
FIG. 9 is a flowchart illustrating an example of updating an object recognition model set illustrated in FIG. 7 (S707).

FIG. 9 is a flowchart illustrating an example of updating the object recognition model set illustrated in FIG. 7 (S707).

Referring to FIG. 9, the processor 180 of the AI apparatus 100 clusters unknown objects by using an object clustering model (S901).

The object clustering model is a model for clustering objects included in the image data. The object clustering model may cluster similar objects based on features extracted from image data. The object clustering model includes an artificial neural network and may be learned using a machine learning algorithm or a deep learning algorithm. The processor 180 may cluster only unknown objects using the object clustering model.

The object clustering model may map each image data on a feature space and cluster objects based on the proximity between the mapped image data. For example, the object clustering model may classify mapped image data within a certain distance into one cluster based on a distance between the image data mapped on the feature space.

The processor 180 of the AI apparatus 100 calculates a cluster recognition frequency (S903).

The processor 180 may calculate a recognition frequency of how much or how often each cluster is recognized for a predetermined period of time. The predetermined period of time may include a time for performing a specific operation. The recognition frequency may refer to the number of recognitions or a ratio of the number of recognitions. For example, if the processor 180 of the AI apparatus 100 attempts to recognize a total of 500 objects using the object recognition model set while operating for 24 hours, but 100 objects are determined as unknown objects and a result of clustering the 100 unknown objects is that the 100 unknown objects are divided into 5 clusters and 30 unknown objects are included in a first cluster, the processor 180 may calculate the recognition frequency for the first cluster as 30 (times) or 0.06. Alternatively, if the processor 180 of the AI apparatus 100 attempts to recognize a total of 200 objects using the object recognition model set while performing a cleaning operation three times, but 20 objects are determined as unknown objects and five unknown objects are included in a second cluster, the processor 180 may calculate the recognition frequency for the second cluster as 5 (times) or 0.025.

A high recognition frequency for a particular cluster indicates that unknown objects included in the cluster, although they are objects that cannot be accurately recognized in the object recognition model set, are similar to each other and are determined as the same type of object, and the objects are often recognized. Therefore, the object corresponding to the cluster having the high recognition frequency is an object that frequently attempts to recognize in the operation process of the AI apparatus 100, the object may be a object that needs to be recognized in the object recognition model set.

The processor 180 of the AI apparatus 100 calculates an object recognition frequency (S905).

The processor 180 may calculate a recognition frequency of how much or how often each object is recognized for a predetermined period of time. The predetermined period of time may include a time for performing a specific operation. The recognition frequency may refer to the number of recognitions or a ratio of the number of recognitions. For example, if the processor 180 of the AI apparatus 100 attempts to recognize a total of 500 objects using the object recognition model set while operating for 24 hours, but 400 objects are successfully recognized and an object "chair" among them is recognized 20 times, the processor 180 may calculate the recognition frequency for "chair" as 20 (times) or 0.04. Alternatively, if the processor 180 of the AI apparatus 100 attempts to recognize a total of 200 objects using the object recognition model set while performing a cleaning operation three times, but 180 objects are successfully recognized and an object "chair" among them is recognized 12 times, the processor 180 may calculate the recognition frequency for "chair" as 12 (times) or 0.06.

The processor 180 of the AI apparatus 100 excludes, from the object recognition model set, an object recognition model that recognizes an object whose recognition frequency is lower than a first predetermined reference value (S907).

The cluster recognition frequency or the object recognition frequency as described above may indicate a distribution for the number of objects that the AI apparatus 100 contacts in the operating zone of the AI apparatus 100. That is, since an object having a low recognition frequency is an object that the AI apparatus 100 rarely faces, the object may be regarded as an object having a low need for recognition. Therefore, the processor 180 of the AI apparatus 100 excludes, from the object recognition model set, an object recognition model that recognizes an object whose recognition frequency is lower than a predetermined reference value (for example, the first reference value).

If a specific object recognition model is excluded from the object recognition model set, the AI apparatus 100 cannot recognize the recognition target object by the excluded object recognition model. Therefore, the first reference value described above may be conservatively set to be small.

The processor 180 of the AI apparatus 100 requests object information corresponding to the first cluster whose recognition frequency is higher than the second predetermined reference value through the output interface 150.

The cluster recognition frequency or the object recognition frequency as described above may indicate a distribution for the number of objects that the AI apparatus 100 contacts in the operating zone of the AI apparatus 100. That is, since an object having a high recognition frequency is an object that the AI apparatus 100 often faces, the object may be regarded as an object having a high need for recognition. Therefore, in order to recognize the object belonging to the first cluster whose recognition frequency is higher than the predetermined reference value (for example, the second reference value), the processor 180 of the AI apparatus 100 may output an output requesting object information corresponding to the first cluster through the output interface 150, and receive the object information corresponding to the first cluster as a response to the request.

If the recognition frequency of the first cluster to which the unknown object included in the input image data belongs is higher than the second predetermined reference value, the processor 180 of the AI apparatus 100 may request object information about the first cluster through the output interface 150 and receive the object information about the first cluster as a response to the request. For example, the processor 180 may request object information about the object included in the current image data by inquiring the sound output module 152 as "What is the object in the front?", and may receive the user's response through the microphone 122 or the user input interface 123 and acquire the object information.

In one embodiment, the processor 180 may request object information about the first cluster in consideration of the change amount of the object recognition frequency. The processor 180 may align the objects in descending order of the decreasing amount of object recognition frequency, query whether the first cluster is the first object whose decreasing amount of recognition frequency is highest, and if a response that the first cluster does not correspond to the first object is acquired, query whether the first cluster is the second object whose decreasing amount of recognition frequency is second highest. For example, if the first object whose recognition frequency is most decreased among the recognition target objects is a "fan", the processor 180 may query whether the first cluster is the "fan" and request object information about the first cluster.

In one embodiment, the processor 180 may request the object information about the first cluster in consideration of the change amount of the object recognition frequency and the change amount of the cluster recognition frequency. The processor 180 may identify the second object that exhibits the decreasing amount of the recognition frequency most similar to the increasing amount of the recognition frequency for the first cluster and query whether the first cluster is the second object whose recognition frequency is reversed to the most similar degree. For example, if the recognition frequency for the first cluster is increased by 0.278 and the recognition frequency of the second object "fan" among the recognition target objects is decreased by 0.299, the processor 180 may query whether the first cluster is the "fan" and request object information about the first cluster.

The processor 180 of the AI apparatus 100 updates the object recognition model set by using the received object information and the image data corresponding to the first cluster (S911).

As described above, since the first cluster has a relatively high recognition frequency, the first cluster corresponds to an object to be recognized through the object recognition model set. Therefore, object information corresponding to the first cluster is received through step S909, and the processor 180 of the AI apparatus 100 may update the object recognition model set based on the image data corresponding to the first cluster and the received object information. The method of updating the object recognition model set may vary depending on whether the object corresponding to the first cluster is an object that is recognizable in the existing object recognition model set.

The processor 180 may determine whether the received object information corresponds to one of the objects that are recognizable in the object recognition model set. If there is the corresponding object, the processor 180 may update the object recognition model for recognizing the corresponding object by using image data corresponding to the first cluster. For example, if a new form factor is formed for a specific type of object, the existing object recognition model may not recognize the object having the new form factor. In this case, if the object having the new form factor is included in the object that is recognizable in the existing object recognition model, this may be reflected to update the object recognition model.

The processor 180 may determine whether the received object information corresponds to one of the objects that are recognizable in the object recognition model set. If there is no corresponding object, the processor 180 may learn a new object recognition model by using the image data corresponding to the first cluster and add the new object recognition model to the object recognition model set. As in the object recognition models included in the existing object recognition model set, the new object recognition model may include at least one shared layer and at least one unshared layer, and the unshared layer may include at least one batch normalization layer and an output layer.

In various embodiments, if the model parameters of the shared layer are changed in the process of generating and learning the new object recognition model or learning the existing object recognition model, the processor 180 may or may not reflect the changed model parameters to the shared layers of the remaining object recognition models according to a selection. In addition, in one embodiment, when generating and learning the new object recognition model or learning the existing object recognition model, the processor 180 may update only the model parameters of the unshared layer while fixing the model parameters of the shared layer.

The order of the steps illustrated in FIG. 9 is merely an example, and the present disclosure is not limited thereto. That is, in one embodiment, the order of some of steps illustrated in FIG. 9 may be reversed. In addition, in one embodiment, some of steps illustrated in FIG. 9 may be performed in parallel.

Figure 10:
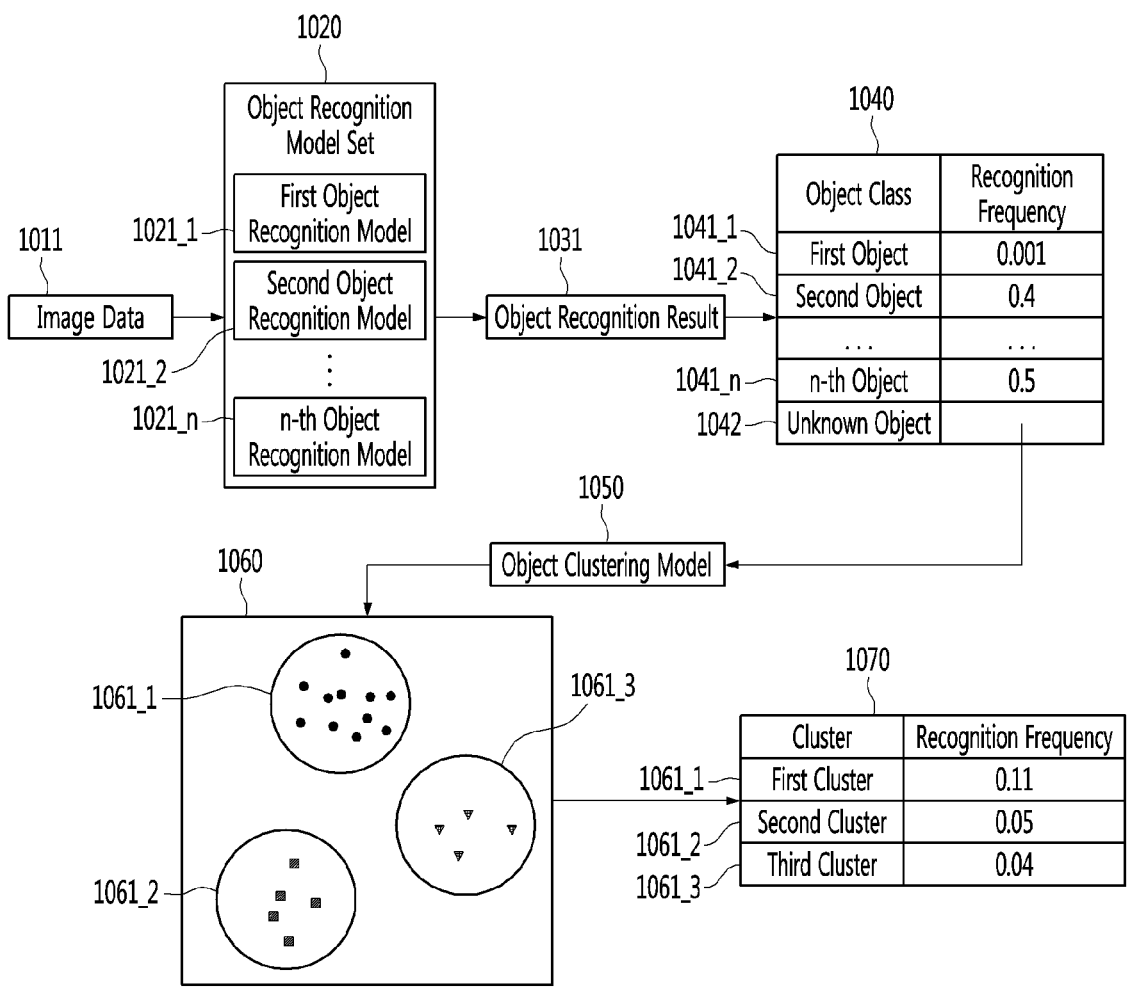
FIG. 10 is a view illustrating an example of a method for calculating a recognition frequency according to an embodiment of the present disclosure.

FIG. 10 is a view illustrating an example of a method for calculating a recognition frequency according to an embodiment of the present disclosure.

Referring to FIG. 10, the processor 180 of the AI apparatus 100 may generate an object recognition result 1031 for received image data 1011 by using an object recognition model set 1020. For example, the object recognition model set 1020 may include a first object recognition model 1021_1 for recognizing a first object 1041_1, a second object recognition model 1021_2 for recognizing a second object 1021_2, and an n-th object recognition model 1021_n for recognizing an n-th object 1041_n.

The processor 180 of the AI apparatus 100 may calculate an object recognition frequency 1040 based on the object recognition result 1031. For example, in the calculated object recognition frequency 1040, the recognition frequency for the first object 1041_1 may be 0.001, the recognition frequency for the second object 1041_2 may be 0.4, and the recognition frequency for the n-th object 1041_$n$ may be 0.5.

The processor 180 of the AI apparatus 100 may cluster unknown objects 1042 by using the object clustering model 1050 for the objects that fail to be recognized through the object recognition model set 1020, that is, the unknown objects 1042. The object clustering model 1050 may map the features extracted from the image data corresponding to the unknown objects 1042 to a feature space 1060, and cluster the unknown objects 1042 based on the similarity or proximity of the mapped image data. For example, the unknown objects 1042 may be clustered into a first cluster 1061_1, a second cluster 1061_2, and a third cluster 1061_3.

The processor 180 of the AI apparatus 100 may calculate the cluster recognition frequency 1070 based on the clustering result of the object clustering model 1050. For example, in the calculated cluster recognition frequency 1070, the recognition frequency for the first cluster 1061_1 may be 0.11, the recognition frequency for the second cluster 1061_2 may be 0.05, and the recognition frequency for the n-th cluster 3_$n$ may be 0.04.

Through the above-described process, the processor 180 of the AI apparatus 100 may calculate an object recognition frequency 1040 and a cluster recognition frequency 1070. The object recognition frequency 1040 may refer to a recognition frequency of objects that are successfully recognized through the object recognition model set 1020, and the cluster recognition frequency 1070 may refer to a recognition frequency of objects that are not recognized through the object recognition model set 1020.

Figure 11:
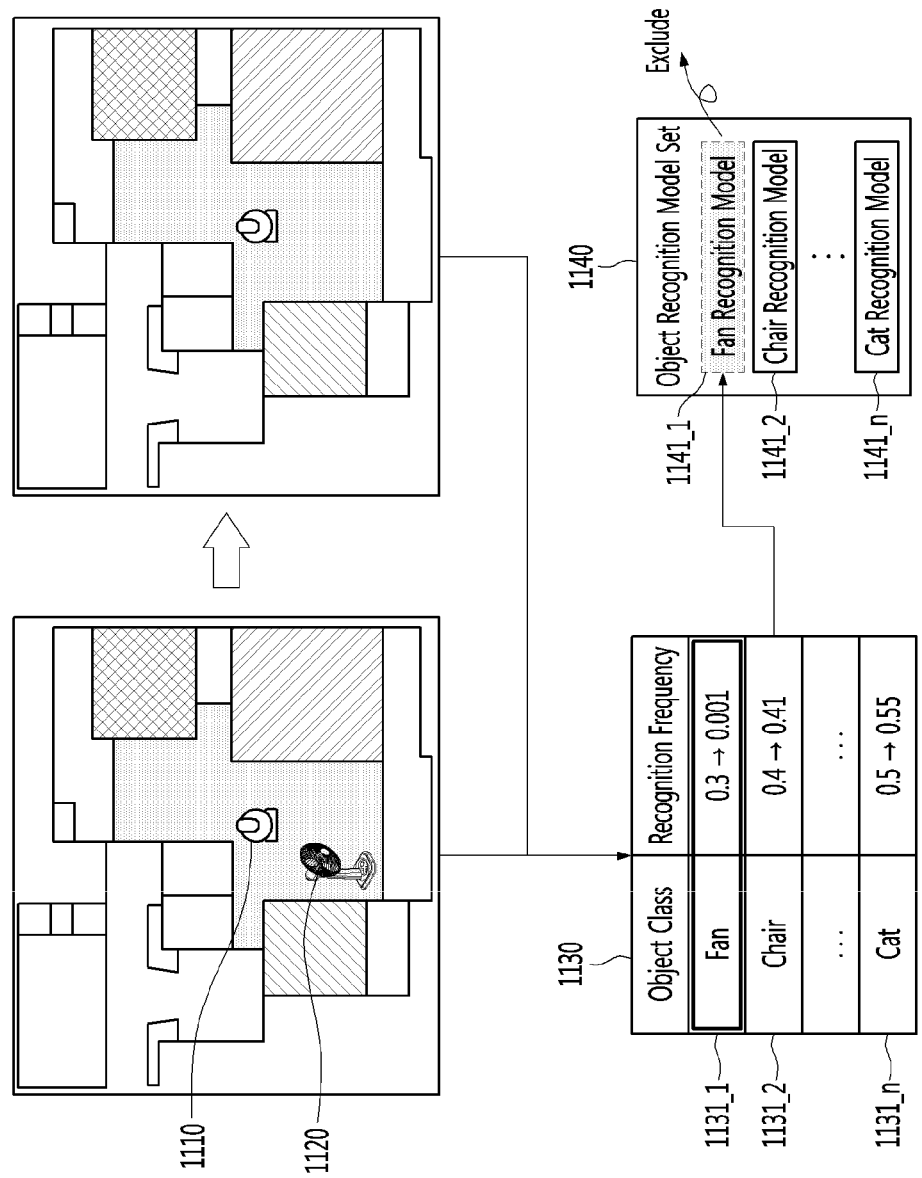
FIG. 11 is a view illustrating an example of a method for updating an object recognition model set according to an embodiment of the present disclosure.

FIG. 11 is a view illustrating an example of a method for updating an object recognition model set according to an embodiment of the present disclosure.

Referring to FIG. 11, the AI apparatus 1110 may be an AI robot cleaner. The AI apparatus 1110 may operate in a predetermined operating zone such as a home. The AI apparatus 1110 may recognize objects in the home by using the object recognition model set 1140 while performing a cleaning operation in the home, and may calculate an object recognition frequency 1130 based on the recognition result. The object recognition model set 1140 may include a fan recognition model 1141_1 for recognizing a fan 1131_1, a chair recognition model 1141_2 for recognizing a chair 1131_2, a cat recognition model 1141_$n$ for recognizing a cat 1131_$n$, and the like.

If the fan 1120 is disposed in the home and then disappears, the recognition frequency of the fan 1131_1 in the object recognition frequency 1130 may be significantly decreased from 0.3 to 0.001. On the other hand, if there is no change in the chair 1131_2 and the cat 1131_$n$ in the home, the recognition frequency of the chair 1131_2 may be slightly changed from 0.4 to 0.41 or maintained as it is. Similarly, the recognition frequency of the cat 1131_$n$ may be slightly changed from 0.5 to 0.55 or maintained as it is.

The AI apparatus 1110 may grasp that the recognition frequency of the fan 1131_1 is significantly decreased to 0.001, and may determine whether the recognition frequency of the fan 1131_1 is smaller than the first predetermined reference value. For example, if it is assumed that the first predetermined reference value is 0.1, the AI apparatus 1110 may exclude the fan recognition model 1141_1 from the object recognition model set 1140 because has the recognition frequency of the fan 1131_1 is smaller than the first predetermined reference value of 0.1.

Figure 12:
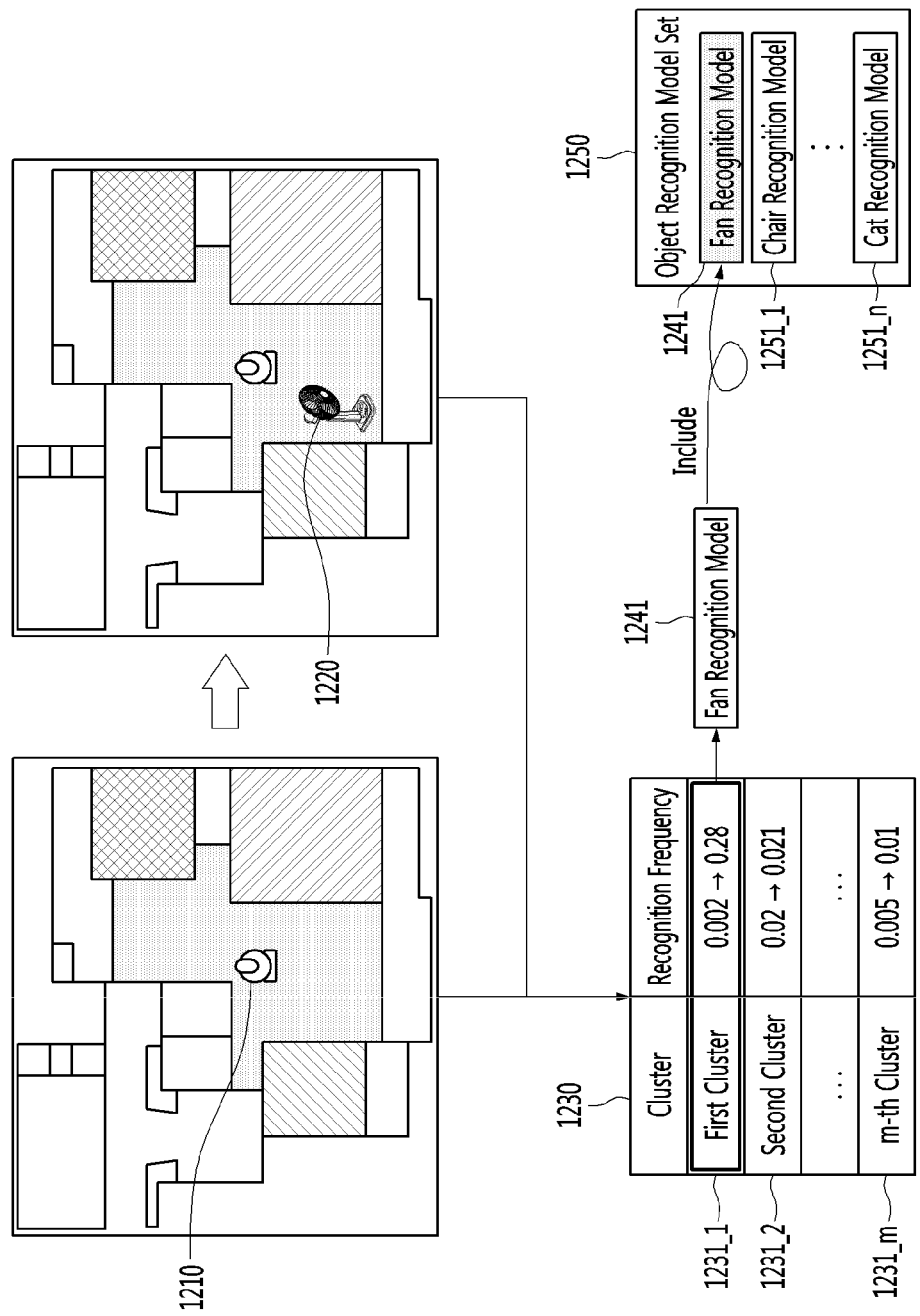
FIG. 12 is a view illustrating an example of a method for updating an object recognition model set according to an embodiment of the present disclosure.

FIG. 12 is a view illustrating an example of a method for updating an object recognition model set according to an embodiment of the present disclosure.

Referring to FIG. 12, the AI apparatus 1210 may be an AI robot cleaner. The AI apparatus 1210 may operate in a predetermined operating zone such as a home. The AI apparatus 1210 may recognize objects in the home by using the object recognition model set 1250 while performing a cleaning operation in the home, and may calculate a cluster recognition frequency 1230 based on the recognition result. The object recognition model set 1250 may include a chair recognition model 1251_1 for recognizing a chair, a cat recognition model 1251_$n$ for recognizing a cat, and the like.

If the fan 1220 that has not existed in the home is newly disposed, the recognition of the fan 1220 may be failed because the AI apparatus 1210 does not include an object recognition model capable of recognizing the fan 1220 in the object recognition model set 1250. The AI apparatus 1210 may determine the fan 1220 as an unknown object. Since the fan 1220 is an object placed in the actual home among unknown objects, the recognition frequency may be high while clustering. As a result obtained when the AI apparatus 1210 clusters the unknown objects, a recognition frequency of a first cluster 1231_1 may be increased from 0.002 to 0.28, a recognition frequency of a second cluster 1231_2 may be slightly changed from 0.02 to 0.021 or maintained as it is, and a recognition frequency of an m-th cluster 1231_$m$ may be slightly changed from 0.005 to 0.01 or maintained as it is.

The AI apparatus 1210 may grasp that the recognition frequency of the first cluster 1231_1 is significantly increased from 0.002 to 0.4, and may determine whether the recognition frequency of the first cluster 1231_1 is greater than the second predetermined reference value. For example, if it is assumed that the second predetermined reference value is 0.1, since the recognition frequency of the first cluster 1231_1 is greater than the second predetermined reference value of 0.1, the AI apparatus 1210 may request the user for object information about the first cluster 1231_1 and may acquire object information about the first cluster 1231_1 in response to the request.

The AI apparatus 1210 may grasp that the first cluster 1231_1 corresponds to the object "fan" based on the object information about the first cluster 1231_1, may learn the fan recognition model 1241 by using the image data corresponding to the first cluster 1231_1, and may add the learned fan recognition model 1241 to the object recognition model set 1250. As a result, the object recognition model set 1250 may include a fan recognition model 1241 for recognizing a fan, a recognition model 1251_1 for recognizing a chair, a cat recognition model 1251_$n$ for recognizing a cat, and the like.

Figure 13:
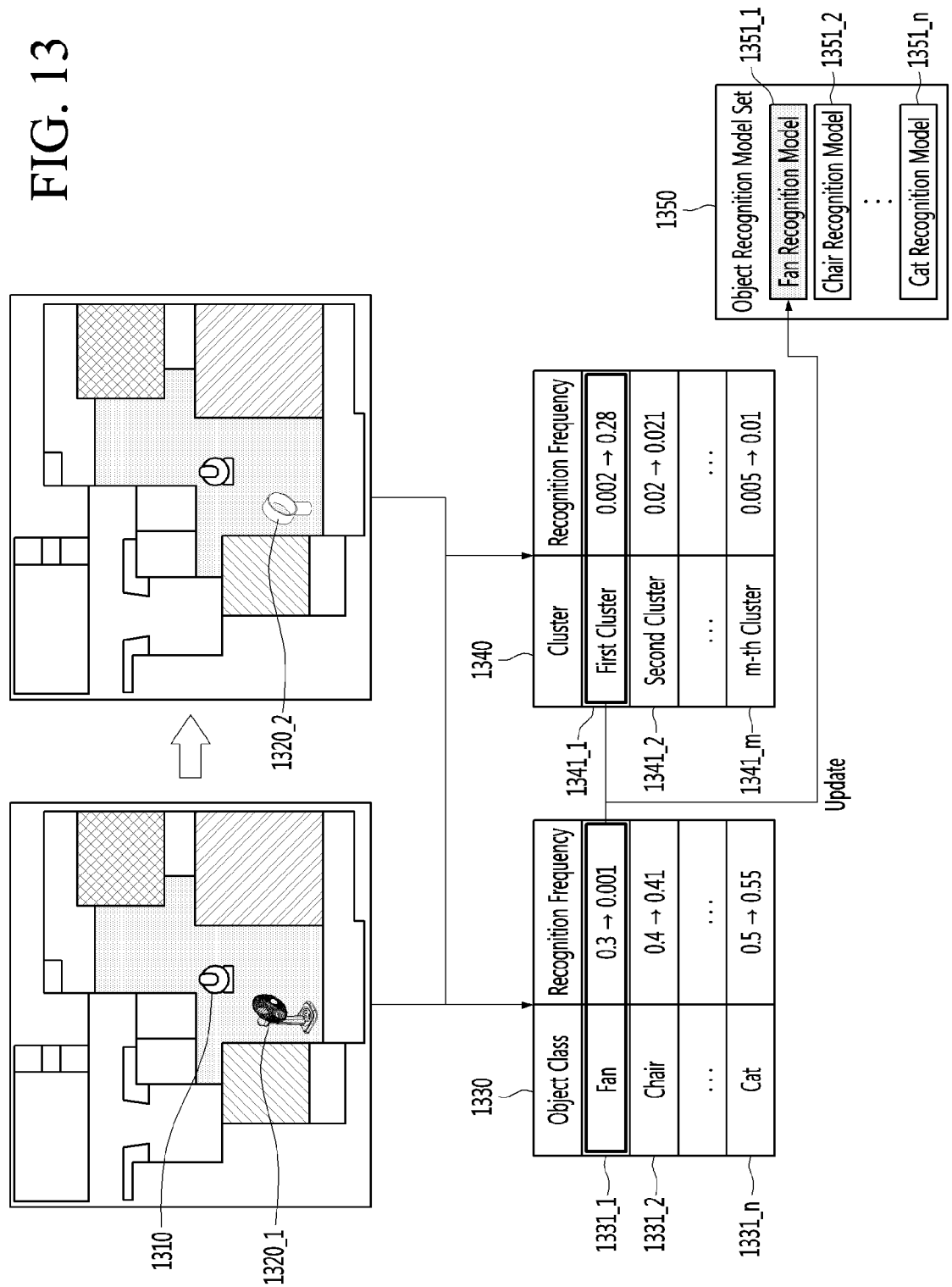
FIG. 13 is a view illustrating an example of a method for updating an object recognition model set according to an embodiment of the present disclosure.

FIG. 13 is a view illustrating an example of a method for updating an object recognition model set according to an embodiment of the present disclosure.

Referring to FIG. 13, the AI apparatus 1310 may be an AI robot cleaner. The AI apparatus 1310 may operate in a predetermined operating zone such as a home. The AI apparatus 1310 may recognize objects in the home by using the object recognition model set 1350 while performing a cleaning operation in the home, and may calculate an object recognition frequency 1330 based on the recognition result. The object recognition model set 1350 may include a fan recognition model 1351_1 for recognizing a fan 1331_1, a chair recognition model 1351_2 for recognizing a chair 1331_2, a cat recognition model 1351_$n$ for recognizing a cat 1331_*n*, and the like. It is assumed that the fan recognition model 1351_1 for recognizing the fan 1331_1 can recognize only the first fan 1320_1 having an existing form factor.

If the first fan 1320_1 that is previously disposed in the home and has the existing form factor is changed to a second fan 1320_2 having a new form factor, the fan recognition model 1351_1 does not recognize the second fan 1320_2 having the new form factor. Therefore, the recognition frequency of the fan 1331_1 in the object recognition frequency 1330 may be significantly decreased from 0.3 to 0.001. On the other hand, if there is no change in the chair 1331_2 and the cat 1331_*n* in the home, the recognition frequency of the chair 1331_2 may be slightly changed from 0.4 to 0.41 or maintained as it is. Similarly, the recognition frequency of the cat 1331_*n* may be slightly changed from 0.5 to 0.55 or maintained as it is.

Since the AI apparatus 1310 does not recognize the second fan 1320_2 having the new form factor by the fan recognition model 1351_1 included in the object recognition model set 1350, the recognition of the second fan 1320_2 may be failed. The AI apparatus 1310 may determine the second fan 1320_2 as an unknown object. Since the second fan 1320_2 is an object placed in the actual home among unknown objects, the recognition frequency may be high at the time of clustering. As a result obtained when the AI apparatus 1310 clusters the unknown objects, a recognition frequency of a first cluster 1431_1 may be increased from 0.002 to 0.28, a recognition frequency of a second cluster 1341_2 may be slightly changed from 0.02 to 0.021 or maintained as it is, and a recognition frequency of an m-th cluster 1431_*m* may be slightly changed from 0.005 to 0.01 or maintained as it is.

The AI apparatus 1310 may grasp that the recognition frequency of the fan 1331_1 is significantly decreased from 0.3 to 0.001 and the recognition frequency of the first cluster 1341_1 is significantly increased from 0.002 to 0.28, and may determine whether the recognition frequency of the first cluster 1341_1 is greater than the second predetermined reference value. For example, if it is assumed that the second predetermined reference value is 0.1, since the recognition frequency of the first cluster 1341_1 is greater than the second predetermined reference value of 0.1, the AI apparatus 1310 may request the user for object information about the first cluster 1341_1 and may acquire object information about the first cluster 1341_1 in response to the request. Since the AI apparatus 1310 grasps that the recognition frequency of the fan 1331_1 is significantly decreased and the recognition frequency of the first cluster 1341_1 is significantly increased, the AI apparatus 1310 may query whether the object corresponding to the first cluster 1341_1 is the fan 1331_1 and acquire object information about the first cluster 1341_1 as a response to the request.

Since the AI apparatus 1310 can grasp that the first cluster 1341_1 corresponds to the object "fan" based on the object information about the first cluster 1341_1 and the fan recognition model 1351_1 is already included in the object recognition model set 1350, the AI apparatus 1310 may update the fan recognition model 1351_1 by using the image data corresponding to the first cluster 1341_1. As a result, the fan recognition model 1351_1 may recognize not only the first fan 1320_1 having the existing form factor but also the second fan 1351_2 having the new form factor.

Although only the situation in which the recognition target object is changed to the object having the new form factor has been described, the present disclosure is not limited thereto. That is, the present disclosure can be applied not only to the situation in which the form factor is changed but also to the situation in which the appearance of the same type of objects is not greatly changed but the object is not accurately recognized due to low performance of the object recognition model.

According to various embodiments of the present disclosure, as the object is recognized using the plurality of object recognition models sharing at least one shared layer each other, high performance of various object recognition models can be expected with a smaller amount of learning.

According to various embodiments of the present disclosure, since the object recognition models constituting the object recognition model set are updated in consideration of the object recognition frequency, the object recognition models suitable for the objects to be recognized in the actual use environment can be dynamically managed and high object recognition performance can be expected with a small amount of computation.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence apparatus for recognizing an object, comprising:
   a camera;
   a memory configured to store a plurality of object recognition models, the plurality of object recognition models sharing at least one shared layer with each other; and
   a processor configured to:
   receive, via the camera, image data including an object;
   recognize the object included in the image data by using an object recognition model set including the plurality of object recognition models; and
   update the object recognition model set based on an object recognition frequency.

2. The artificial intelligence apparatus according to claim 1, wherein the object recognition model includes a convolutional neural network (CNN) and is learned using a machine learning algorithm or a deep learning algorithm.

3. The artificial intelligence apparatus according to claim 2, wherein the object recognition model includes the shared layer and at least one unshared layer, and
   wherein the unshared layer includes at least one batch normalization (BN) layer and an output layer.

4. The artificial intelligence apparatus according to claim 3, wherein the object recognition model is a model for recognizing a single type of object.

5. The artificial intelligence apparatus according to claim 4, wherein the processor is configured to calculate object recognition frequencies of objects that have been successfully recognized by using the object recognition model set.

6. The artificial intelligence apparatus according to claim 5, wherein the processor is configured to exclude, from the object recognition model set, a first object recognition model that recognizes a first object whose calculated object recognition frequency is lower than a first predetermined reference value.

7. The artificial intelligence apparatus according to claim 5, wherein the processor is configured to:

determine, as unknown objects, objects that fail to be recognized by using the object recognition model set;
cluster the unknown objects into a plurality of clusters; and
calculate cluster recognition frequencies of the clusters.

8. The artificial intelligence apparatus according to claim 7, further comprising an output interface including a display or a sound output interface,
wherein the processor is configured to request, via the display or the sound output interface, object information about a first cluster whose calculated cluster recognition frequency is higher than a second predetermined reference value.

9. The artificial intelligence apparatus according to claim 8, wherein the processor is configured to request the object information about the first cluster in consideration of the object recognition frequencies.

10. The artificial intelligence apparatus according to claim 8, further comprising an input interface including a microphone or a user input interface,
wherein the processor is configured to:
receive the object information about the first cluster via the microphone or the user input interface; and
update the object recognition model set by using the received object information and image data corresponding to the first cluster.

11. The artificial intelligence apparatus according to claim 10, wherein, if the received object information corresponds to one of recognition target objects of the object recognition model set, the processor is configured to update a second object recognition model that corresponds to the object information and is included in the object recognition model set.

12. The artificial intelligence apparatus according to claim 10, wherein, if the received object information does not correspond to any of recognition target objects of the object recognition model set, the processor is configured to learn a new third object recognition model that recognizes the object information, and add the learned third object recognition model to the object recognition model set, and
wherein the third object recognition model includes the shared layer and at least one unshared layer.

13. A method for recognizing an object, comprising:
storing a plurality of object recognition models, the plurality of object recognition models sharing at least one shared layer with each other;
receiving, via a camera, image data including an object;
recognizing the object included in the image data by using an object recognition model set including the plurality of object recognition models; and
updating the object recognition model set based on an object recognition frequency.

14. A non-transitory recording medium having recorded thereon a computer program for controlling a processor to perform a method for recognizing an object, the method comprising:
storing a plurality of object recognition models, the plurality of object recognition models sharing at least one shared layer with each other;
receiving, via a camera, image data including an object;
recognizing the object included in the image data by using an object recognition model set including the plurality of object recognition models; and
updating object recognition model set based on an object recognition frequency.

* * * * *